(No Model.) 3 Sheets—Sheet 2.

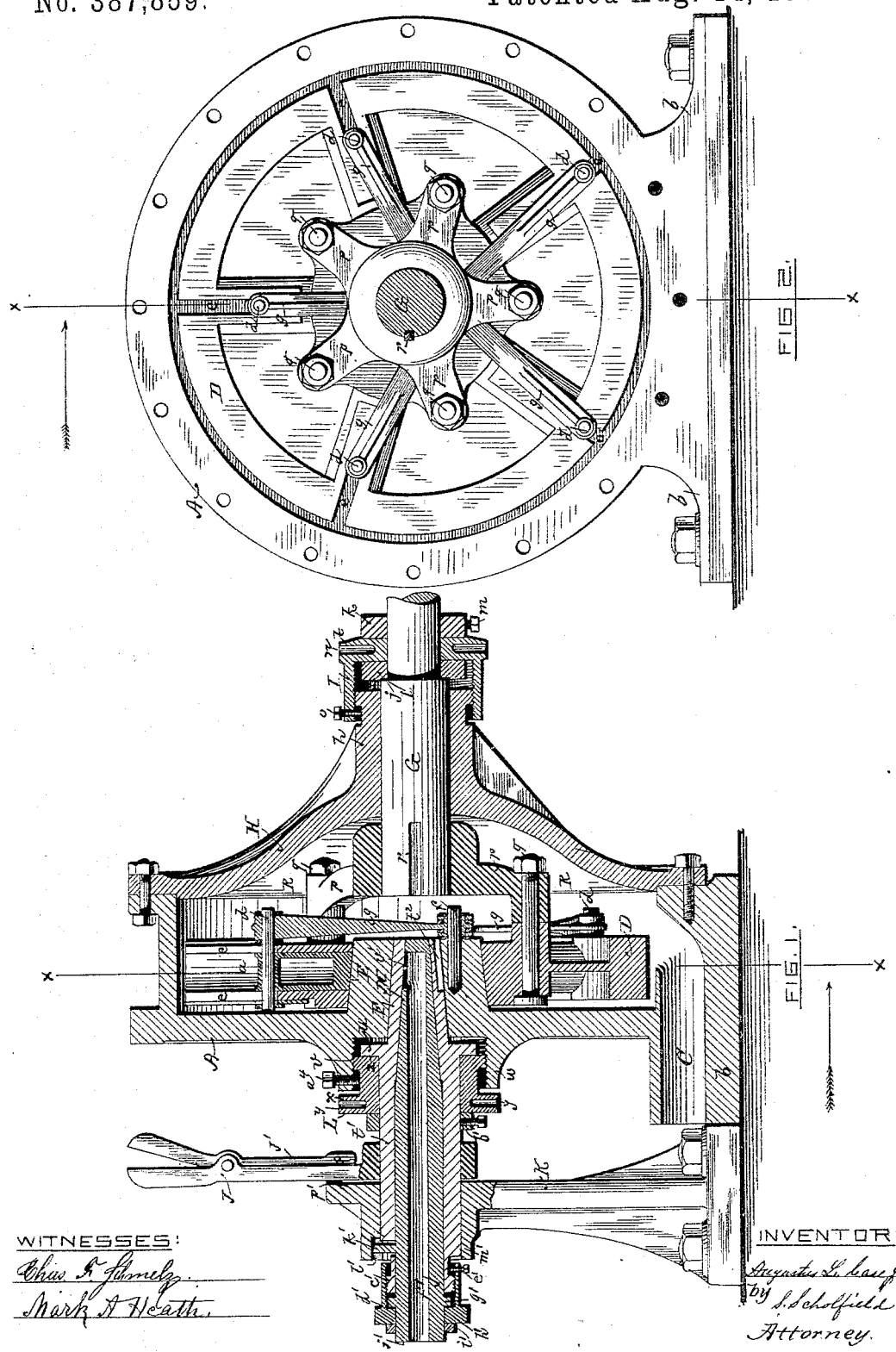

A. L. CASE, Jr.
REVERSING VALVE FOR ROTARY ENGINES.

No. 387,859. Patented Aug. 14, 1888.

WITNESSES:
Chas. F. Schmelz
Mark D. Heath

INVENTOR:
Augustus L. Case Jr.
by G. Scholfield
Attorney.

(No Model.) 3 Sheets—Sheet 3.

A. L. CASE, Jr.
REVERSING VALVE FOR ROTARY ENGINES.

No. 387,859. Patented Aug. 14, 1888.

WITNESSES:
Chas. F. Schmelz
Mark A. Heath

INVENTOR:
Augustus L. Case Jr.
by S. Scholfield
Attorney

UNITED STATES PATENT OFFICE.

AUGUSTUS L. CASE, JR., OF BRISTOL, RHODE ISLAND.

REVERSING-VALVE FOR ROTARY ENGINES.

SPECIFICATION forming part of Letters Patent No. 387,859, dated August 14, 1888.

Application filed November 8, 1887. Serial No. 254,663. (No model.)

*To all whom it may concern:*

Be it known that I, AUGUSTUS L. CASE, Jr., a citizen of the United States, residing at Bristol, in the county of Bristol and State of Rhode Island, have invented a new and useful Improvement in Reversing-Valves for Rotary Engines, of which the following is a specification.

My invention relates to that class of rotary engines in which the rotary motion of the shaft is derived from reciprocating pistons operating within the radial chambers of a rotary head; and it consists in the improved construction and arrangement of the reversing-valve gear for such engines.

Figure 3:
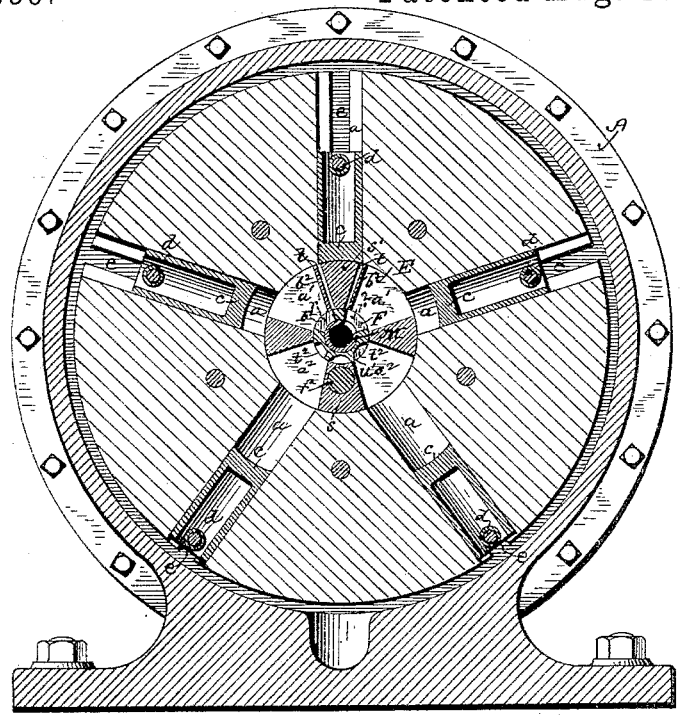
Figure 4:
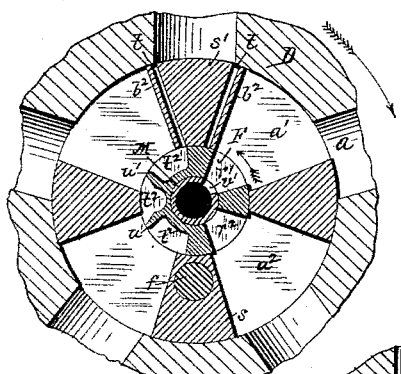
Figure 5:
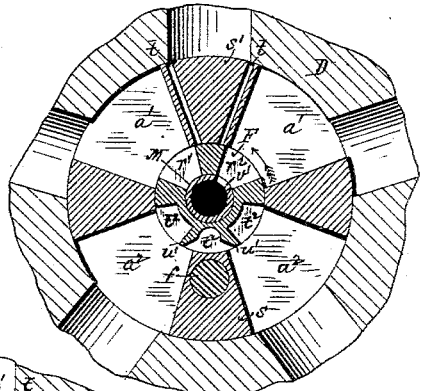
Figure 6:
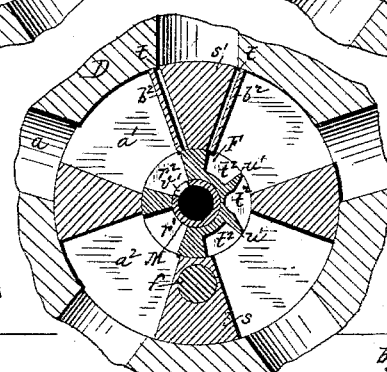
Figure 8:
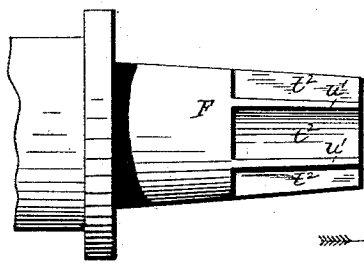
Figure 7:
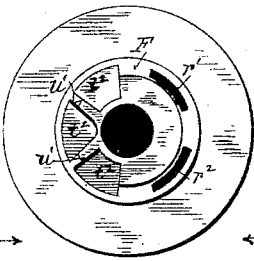
Figure 9:
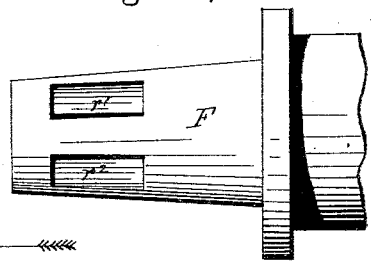
Figure 10:
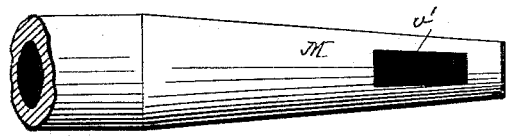
Figures 11, 12:
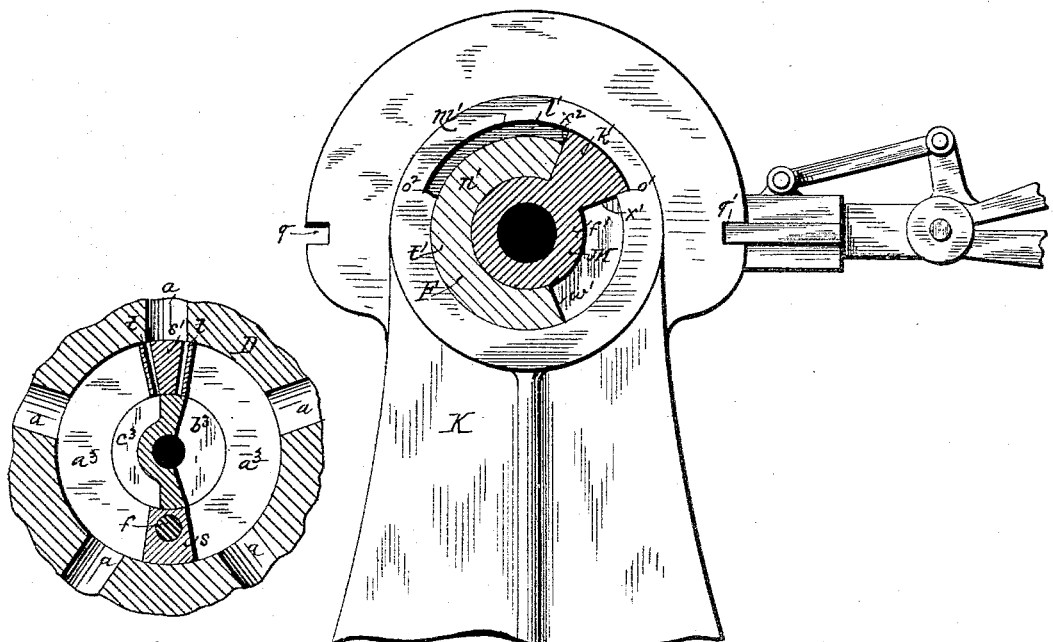

Figure 1 represents a vertical axial section of a rotary engine provided with my improved reversing-valve, taken in the line $x\ x$ of Fig. 2. Fig. 2 is a side view with the head of the case removed. Fig. 3 is a vertical section taken in the line $x\ x$ of Fig. 1. Figs. 4, 5, and 6 are sectional views, showing the various positions of the reversing-valves within the stationary valve. Figs. 7, 8, 9, and 10 are detail elevations of the reversing-valves. Fig. 11 is a detail view of the valve operating and locking mechanism.

In the accompanying drawings, A represents the fixed portion of the outer case, having an attaching-base, $b$, an exhaust-passage, C, and a stationary tapered valve, E, on which the rotary head D is made to revolve. Within the radially-directed cylindrical chambers $a\ a$ of the rotary head are placed the pistons $c\ c$, which are provided at their outer ends with the transverse pins $d\ d$, passing through the guiding-slots $e\ e$ at each side of the piston-chamber, and connection is made from the pins $d$ to the pin $f$, located eccentrically upon the inner end of the stationary valve E, by means of the connecting-rods $g\ g$.

The shaft G passes through the hub $h$ of the removable head H of the case, the said hub being provided at its outer end with the screw-cap I, the head $i$ of which is held between the collars $j$ and $k$ upon the shaft G, the inner collar, $j$, resting against the shoulder $l$ upon the shaft, and the outer collar, $k$, being secured to the said shaft by means of the set-screw $m$.
The head $i$ of the screw-cap I is provided with the radial holes $n$, adapted for the insertion of a pin, which is to be used as a lever for turning the cap, the said cap being held in a set position by means of the set-screw $o$.

The shaft G is secured to the rotary head D by means of the spider-arms $p$, which are secured by means of the bolts $q$ to the side of the rotary head, the said spider-arms being secured to the shaft G by means of the key $r$. The valve E being made slightly tapering, the inward movement of the screw-cap I will serve to tighten the bearing-joint between the rotary head D and the valve E.

The stationary valve E is provided with the ports $a'\ a'$, through which the operating-fluid can be admitted to the piston-chambers of the rotary head, and also with the ports $a^2\ a^2$. The eccentric-pin $f$ is located at the end of the valve E, in line with the partition $s$, between the lower ports, $a^2\ a^2$, the partition $s'$ between the upper ports, $a'\ a'$, being provided with the supplementary ports $t\ t$.

Within the tapering cavity of the stationary valve E is placed the valve F, having a hollow stem, $t'$, to which is secured the hand-lever J, provided with the hand-operated catch-lever J', having a catch, $p'$, which engages with proper perforations or notches made in the side or edge of the stand K, a catch, $p'$, entering at the side, being shown in Fig. 1, and a sliding catch engaging with opposite notches, $q'$, at the edge of the flange, being shown in Fig. 11. The valve-stem $t'$ is supported loosely in the stand K and is provided with the flange $u$. In order to provide suitable means for holding the valve F to its seat, I provide a screw-sleeve, L, which engages with the internal thread, $v$, of the projecting hub $w$ of the case, the said screw-sleeve being provided with the head $x$, having the radial openings $y$, which are adapted to receive the pin employed to turn the same, and also bearing at its inner end against the shoulder $z$ of the flange $u$, being also secured in its set position by means of the set-screw $a^4$, and against the outer end of the screw-sleeve L is placed the collar $b'$. The screw-sleeve L will thus be held loosely between the shoulder $z$ and the collar, so that movement of the sleeve L in either direction will impart a corresponding movement to the valve F. The outer end of the stem $t'$, beyond stand K, is provided with a screw-thread, $c'$, upon which is placed the screw-cap $d'$, which can be held in proper fixed position by means of the set-screw $e'$.

Within the tapering cavity of the valve F is placed the supplementary valve M, which has a projecting hollow stem, $f'$, provided with the fixed collar $g'$, against which the head $h'$ of the screw-cap $d'$ is made to rest, being held against the said flange by means of the collar $i'$, so that an axial movement of the screw-cap $d'$ in either direction will be imparted to the supplementary valve M, and by means of the screw-cap $d'$ the valve M can be kept tightly closed to its seat. From the outer end, $j'$, of the valve stem $f'$ suitable pipe-connection is to be made to a reservoir of fluid under pressure, by means of which the engine is to be operated. The stem $f'$ of the supplementary valve M is provided with a projecting segment, $k'$, which extends outward to a recess, $l'$, made in the end of the hub $m'$ of the stand K, the ends of the said recess serving to limit the angular movement of the supplementary valve.

The valve F is provided with a rearwardly-projecting segment, $n'$, (shown in section in Fig. 11,) which, upon the angular movement of the valve F by means of the hand-lever J, engages with the edge of the segment $k'$ of the supplementary valve and carries the same until the said segment arrives at either one of its stop-shoulders $o'$ $o^2$, according to the direction in which the valve F is being moved.

The valve F is provided with the two induction-ports $r'$ $r^2$ and the exhaust-port $t^2$, which extends to the end of the valve, thus admitting the exhaust into the chamber R of the outer case, from which it will pass out through the exhaust-passage C. The exhaust-port $t^2$ may be divided into three passages by means of the partitions $u'$, the edges of which will serve to support the valve against the walls of the cavity in which it is placed; but, if desired, such partitions can be dispensed with in practice. The supplementary valve M is also provided with a single inlet-port, $v'$, and the position of the hand-lever J, as shown in Fig. 11, corresponds to the positions of the supplementary valve M and the valve F. (Shown in Fig. 4.) The steam which drives the engine will in this case pass directly through the ports $v'$, $r'$, and $a'$ to the piston-chamber $a$, thus causing the rotary head D to move in the direction of the arrow, and the steam which enters the piston-chamber $a$ will by the rotation of the head D be cut off at about one-half stroke, to be expanded under the piston $c$ for the remainder of the stroke, during which the piston-chamber $a$ will pass over the closed ports $r^2$ $a^2$, and will be exhausted from the port $t^2$ at the end of the valve F upon the return-stroke of the piston $c$. Whenever it is desired to cause the reversal of the movement of the engine, the hand-lever J is to be carried over to the opposite notch, $q'$, or catch-opening of the stand K, and in this case the primary movement of the valve F will not cause a corresponding movement of the supplementary valve M, and the said supplementary valve will continue in its former position until the lever J has been brought from its previous horizontal position to an intermediate upright position, as shown in Fig. 1, at which point the valves will occupy the relative position shown in Fig. 3, and also shown enlarged in Fig. 5, in which it is seen that the supplementary valve still remains in its former position; but at this point the face $w'$ of the segment $n'$ of the valve F will engage with the face $x'$ of the segment $k'$, and thereafter the two valves will move together until the face $x^2$ of the segment $k'$ strikes the stop-shoulder $o^2$, at which point the valves F and M will be in their properly-reversed position, as shown in Fig. 6, and in this case the steam will enter the piston-chamber $a$ through the ports $v'$ $r^2$ $a'$, to cause the rotation of the rotary head D in the opposite direction, as shown by the arrow, and the reverse movement of the hand-lever J will bring the valves F and M back in the same manner to their former position and cause the head D to rotate as before.

The supplementary ports $t$ $t$ in the partition $s'$ of the stationary valve E provide for a continuance of the exhaust after the piston-chamber $a$ passes the face $b^2$ of the reverse inlet-port. Thus the exhaust, when the cylinders are revolving in one direction, will be carried to a point beyond the inlet of steam when the cylinders are revolving in the reverse direction, which is a desirable feature of my invention. Any desirable number of piston-chambers may be employed in the rotary head D, with corresponding modifications in the valve-ports.

If it is desired to allow the steam to follow the pistons at full pressure for the whole length of the stroke, it will not be necessary to employ the supplementary valve. The stationary valve may in that case be provided with two opposite ports, $a^3$ $a^3$, which are used alternately as inlet and exhaust ports, and having the partitions $s$ $s'$ between them, as shown in Fig. 12, the reversing-valve being also provided with the inlet-port $b^3$ and exhaust-port $c^3$, which is arranged to exhaust into the chamber R of the outer case.

It is to be understood that I do not limit my invention to the rotary head having piston-chambers with reciprocating pistons which are connected to an eccentric-pin, as it is well known that the rotary movement of the head can be obtained by means of cranks and gears or otherwise without changing the operation of the reversing-valve, which exhausts into the chamber of the outer case.

I claim as my invention—

1. In a rotary engine, the combination, with the rotary head provided with radial piston-chambers, of the eccentric-pin, the reciprocating piston operatively connected with the eccentric-pin, the stationary valve provided with the inlet and exhaust ports, the reversing-valve provided with duplicate inlet-ports and an exhaust-port leading to the end of the valve, and the supplementary valve arranged within the reversing-valve, substantially as described.

2. In a rotary engine, the combination, with the rotary head provided with radial piston-chambers, of the eccentric-pin, the reciprocating pistons operatively connected with the eccentric-pin, the stationary valve provided with the inlet and exhaust ports, the reversing-valve provided with the projecting segment, and the supplementary valve provided with a segment adapted for engagement with the segment of the reversing-valve, substantially as described.

3. In a rotary engine, the combination, with the rotary head provided with radial piston-chambers, of the eccentric-pin, the reciprocating pistons operatively connected with the eccentric-pin, the stationary valve provided with the engaging-segment, the supplementary valve provided with a segment adapted for engagement with the segment of the reversing-valve, and the hand-lever provided with a holding-catch, substantially as described.

4. In a rotary engine, the combination, with the rotary head provided with radial piston-chambers and the reciprocating pistons, of the stationary valve provided with inlet and exhaust ports, and with the supplementary exhaust-ports, substantially as described.

5. In a rotary engine, the combination, with the rotary head provided with radial piston-chambers and the reciprocating pistons, of the stationary valve provided with the inlet and exhaust ports, the reversing-valve provided with duplicate inlet-ports and an exhaust-port leading to the end of the valve, and the supplementary valve operated by the movement of the said reversing-valve, substantially as described.

6. In a rotary engine, the combination, with the outer case and the rotary head provided with radial piston-chambers, of the reciprocating pistons, the stationary valve, the reversing-valve adapted to exhaust into the chamber of the outer case, and the supplementary valve, substantially as described.

AUGUSTUS L. CASE, JR.

Witnesses:
JOHN S. LYNCH,
SOCRATES SCHOLFIELD.